(12) United States Patent
Fan et al.

(10) Patent No.: US 11,588,342 B2
(45) Date of Patent: Feb. 21, 2023

(54) CHARGING CIRCUIT, ELECTRONIC DEVICE, CHARGING CONTROL METHOD AND DEVICE

(71) Applicant: BEIJING XIAOMI MOBILE SOFTWARE CO., LTD., Beijing (CN)

(72) Inventors: Jie Fan, Beijing (CN); Changyu Sun, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 235 days.

(21) Appl. No.: 16/895,532

(22) Filed: Jun. 8, 2020

(65) Prior Publication Data

US 2021/0175735 A1   Jun. 10, 2021

(30) Foreign Application Priority Data

Dec. 6, 2019   (CN) .......................... 201911244554.5

(51) Int. Cl.
H02J 7/00   (2006.01)

(52) U.S. Cl.
CPC ...... *H02J 7/00714* (2020.01); *H02J 7/00034* (2020.01); *H02J 7/00045* (2020.01); *H02J 2207/30* (2020.01); *H02J 2310/22* (2020.01)

(58) Field of Classification Search
USPC ......................................................... 320/103
See application file for complete search history.

(56) References Cited

U.S. PATENT DOCUMENTS

| 2009/0085538 A1* | 4/2009 | Miguchi | ................ H02M 3/07 323/273 |
| 2014/0070758 A1* | 3/2014 | Zhou | ...................... G06F 1/266 361/679.01 |

(Continued)

FOREIGN PATENT DOCUMENTS

| CN | 108964187 | * 12/2008 |
| CN | 106026247 A | 10/2016 |

(Continued)

OTHER PUBLICATIONS

Extended European Search Report in Application No. 20181698.0, dated Nov. 11, 2020.

*Primary Examiner* — Samuel Berhanu
(74) *Attorney, Agent, or Firm* — Syncoda LLC; Feng Ma

(57) ABSTRACT

A charging circuit applied to a first electronic device includes a charging interface, a charging module coupled therewith and configured to detect a connection between the charging interface and a second electronic device, and adjust a current output to the second electronic device, a reverse charging protocol module, and a control module. The reverse charging protocol module is configured to determine a reverse charging protocol matched with the charging current of the second electronic device. The control module is coupled with the charging module and the reverse charging protocol module, and configured to acquire the reverse charging protocol determined by the reverse charging protocol module in response to the connection between the charging interface and the second electronic device, and control the charging module to adjust the current output to the second electronic device based on the reverse charging protocol. The charging circuit can increase the reverse charging current.

18 Claims, 6 Drawing Sheets

(56) References Cited

U.S. PATENT DOCUMENTS

2017/0098946 A1* 4/2017 Walls ................. H02J 7/342
2018/0062409 A1* 3/2018 Jung .................. H02J 7/342
2018/0115179 A1* 4/2018 Fan ................... H02J 50/10

FOREIGN PATENT DOCUMENTS

| CN | 107834628 A | 3/2018 |
| CN | 108964182 A | 12/2018 |
| CN | 108964187 A | 12/2018 |

* cited by examiner

CHARGING CIRCUIT, ELECTRONIC DEVICE, CHARGING CONTROL METHOD AND DEVICE

CROSS-REFERENCE TO RELATED APPLICATION

This application claims priority to Chinese Patent Application No. 201911244554.5 filed on Dec. 6, 2019, the disclosure of which is hereby incorporated by reference in its entirety.

BACKGROUND

Mobile phones, tablets, and other electronic devices have limited power storage capacity, and may shut down due to insufficient power when not connected to a power supply. In some situations, a reverse charging function may enable an electronic device to be used as a power source to reversely charge other electronic devices.

SUMMARY

The present disclosure relates generally to the electronic devices, and more specifically to a charging circuit, an electronic device, and a charging control method and device.

According to a first aspect of the present disclosure, there is provided a charging circuit, applied to a first electronic device configured to charge a second electronic device, including:

a charging interface;

a charging module coupled with the charging interface and configured to detect connection between the charging interface and the second electronic device and adjust a current output to the second electronic device;

a reverse charging protocol module configured to determine a reverse charging protocol matched with the current of charging the second electronic device; and a control module coupled with the charging module and the reverse charging protocol module and configured to acquire the reverse charging protocol determined by the reverse charging protocol module in response to the connection between the charging interface and the second electronic device, and control the charging module to adjust the current output to the second electronic device based on the reverse charging protocol.

In some embodiments, the charging module includes: a battery, a current management unit and a charging chip sequentially coupled, wherein the current management unit is configured to adjust the current, and the charging chip is configured to detect the connection between the charging interface and the second electronic device and output the current to the second electronic device.

In some embodiments, the current management unit includes at least one of a charge pump circuit and boost circuit.

In some embodiments, the reverse charging protocol module supports a first charging protocol and a second charging protocol, a charging current value supported by the second charging protocol being less than a charging current value supported by the first charging protocol; and the reverse charging protocol module is configured to:

send a handshake protocol to the second electronic device based on the first charging protocol;

determine the first charging protocol as the reverse charging protocol when receiving a response message sent by the second electronic device according to the handshake protocol; and determine the second charging protocol as the reverse charging protocol when not receiving the response message sent by the second electronic device according to the handshake protocol.

In some embodiments, the first charging protocol includes QC protocol, and the second charging protocol includes BC protocol.

In some embodiments, the charging module includes a charge pump circuit and a boost circuit and is configured to adjust the current;

the control module is configured to control the charge pump circuit to adjust the current in response to the QC protocol as the reverse charging protocol; and the control module is specifically configured to control the boost circuit to adjust the current in response to the BC protocol as the reverse charging protocol.

In some embodiments, the reverse charging protocol module includes a protocol chip and a protocol power supply unit configured to supply power for the protocol chip, the protocol chip and a protocol power supply unit being coupled with the control module; and the control module is further configured to control the protocol power supply unit to supply power for the protocol chip in response to the connection between the charging interface and the second electronic device.

In some embodiments, the charging circuit further includes an interface switching module coupled with the charging interface, the reverse charging protocol module and the control module; and the control module is further configured to control the interface switching module to communicate reverse charging protocol module with the charging interface in response to the connection between the charging interface and the second electronic device, such that the reverse charging protocol module determines the reverse charging protocol.

In some embodiments, the control module is further configured to control the interface switching module to disconnect the reverse charging protocol module with the charging interface and to communicate the control module with the charging interface in response to the non-connection between the charging interface and the second electronic device and, such that the control module controls the charging module to receive the current inputted from the charging interface.

In some embodiments, the charging module is further configured to detect the battery value stored by the charging circuit;

the control module is further configured to acquire the battery value detected by the charging module, and send out a prompting message, in response to the battery value less than a first predetermined threshold;

the control module is further configured to control the charging module to adjust the first current output to the second electronic device, in response to the battery value being greater than or equal to the first predetermined threshold and less than or equal to a second predetermined threshold; and the control module is further configured to control the charging module to adjust the second current output to the second electronic device, in response to the battery value greater than the second predetermined threshold, the value of the second current being greater than the value of the first current.

According to another aspect of the present disclosure, there is provided an electronic device including any above-mentioned charging circuit.

According to another aspect of the present disclosure, there is provided a charging control method, which is applied to a first electronic device configured to charge a second electronic device and including a charging circuit having a charging interface and a charging module, the charging control method including steps of:

acquiring a reverse charging protocol matched with the charging current of the second electronic device, in response to the connection between the charging interface and the second electronic device; and controlling the charging module to adjust the current output to the second electronic device based on the reverse charging protocol.

In some embodiments, the reverse charging protocol includes a first charging protocol and a second charging protocol; the charging current value supported by the second charging protocol is less than the charging current value supported by the first charging protocol; and the step of acquiring the reverse charging protocol includes:

acquiring the first charging protocol when receiving a response message sent by the second electronic device in response to a handshake protocol sent by the first electronic device based on the first charging protocol; and acquiring the second charging protocol when not receiving the response message within a reference time period.

In some embodiments, the first charging protocol includes QC protocol; the second charging protocol includes BC protocol; the charging module includes a charge pump circuit and a boost circuit; and the step of controlling the charging module to adjust the current output to the second electronic device based on the reverse charging protocol includes:

controlling the charge pump circuit to adjust the current in response to the QC protocol determined as the reverse charging protocol; and controlling the boost circuit to adjust the current in response to the BC protocol determined as the reverse charging protocol.

In some embodiments, the first electronic device further includes a reverse charging protocol module including a protocol chip and a protocol power supply unit configured to supply power for the protocol chip the charging control method further including:

controlling the protocol power supply unit to supply power for the protocol chip in response to the connection between the charging interface and the second electronic device.

In some embodiments, the charging circuit further includes an interface switching module, the charging control method further including:

controlling the interface switching module to communicate the reverse charging protocol module with the charging interface in response to the connection between the charging interface and the second electronic device, such that the reverse charging protocol module determines the reverse charging protocol.

In some embodiments, the charging control method further includes:

controlling the interface switching module to disconnect the reverse charging protocol module and the charging interface, and controlling the charging module to receive the current inputted from the charging interface, in response to the non-connection between the charging interface and the second electronic device.

In some embodiments, the charging module is further configured to detect the battery value stored by the charging circuit, the charging control method further including:

acquiring the battery value detected by the charging module;

sending out a prompting message in response to the battery value less than a first predetermined threshold;

controlling the charging module to adjust a first current output to the second electronic device in response to the battery value greater than or equal to the first predetermined threshold and less than or equal to a second predetermined threshold; and controlling the charging module to adjust a second current output to the second electronic device in response to the battery value greater than the second predetermined threshold, the value of the second current being greater than the value of the first current.

According to another aspect of the present disclosure, there is provided a charging control device being applied to a first electronic device configured to charge a second electronic device and including a charging circuit having a charging interface and a charging module, the charging control device including:

a first acquisition module configured to acquire a reverse charging protocol matched with the charging current of the second electronic device in response to the connection between the charging interface and the second electronic device; and a first control module configured to control the charging module to adjust the current output to the second electronic device based on the reverse charging protocol.

According to still another aspect of the present disclosure, there is provided a charging control device including one or more processors and a memory, wherein programs capable of being called by the processors are stored in the memory; and any above-mentioned charging control method is implemented when the processor executes the programs.

According to still another aspect of the present disclosure, there is provided a computer-readable storage medium having stored therein programs and implementing any above-mentioned charging control method when the programs are executed by a processor.

It should be understood that the above general description and the following detailed description are exemplary and explanatory, and should not limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

The terms used in the present disclosure are for the purpose of describing particular embodiments only and are not intended to limit the present disclosure. Unless otherwise defined, the technical or scientific terms used in the present disclosure shall have the ordinary meanings understood by those with ordinary skills in the art to which the present disclosure belongs. The terms "first," "second," and the like used in the description and the claims of the present disclosure do not indicate any order, quantity or importance, but are only used to distinguish different components. Similarly, similar words such as "a" or "an" do not indicate a limit on quantity, but rather indicate that there is at least one. Unless otherwise specified, "comprise" or "include" and similar words mean that the element or object appearing before "comprise" or "include" encompasses the element or object appearing after "comprise" or "include" and the equivalent thereof, without excluding other elements or objects. Words such as "connection/connecting" or "connected" are not limited to physical or mechanical connection, and may include direct or indirect electrical connection.

The singular forms "a/an," "the" and "said" used in the description of the present disclosure and the attached claims are intended to include the plural forms, unless the context clearly indicates otherwise. It should be understood that terms "and/or" used herein refers to and comprises any or all possible combinations of one or more of the associated listed items.

Various embodiments of the present disclosure can address that the reverse charging current is still low, resulting in poor user experience and low usage of the reverse charging function. Hence, various embodiments of the present disclosure to provide a charging circuit capable of increasing the reverse charging current.

Figure 1:
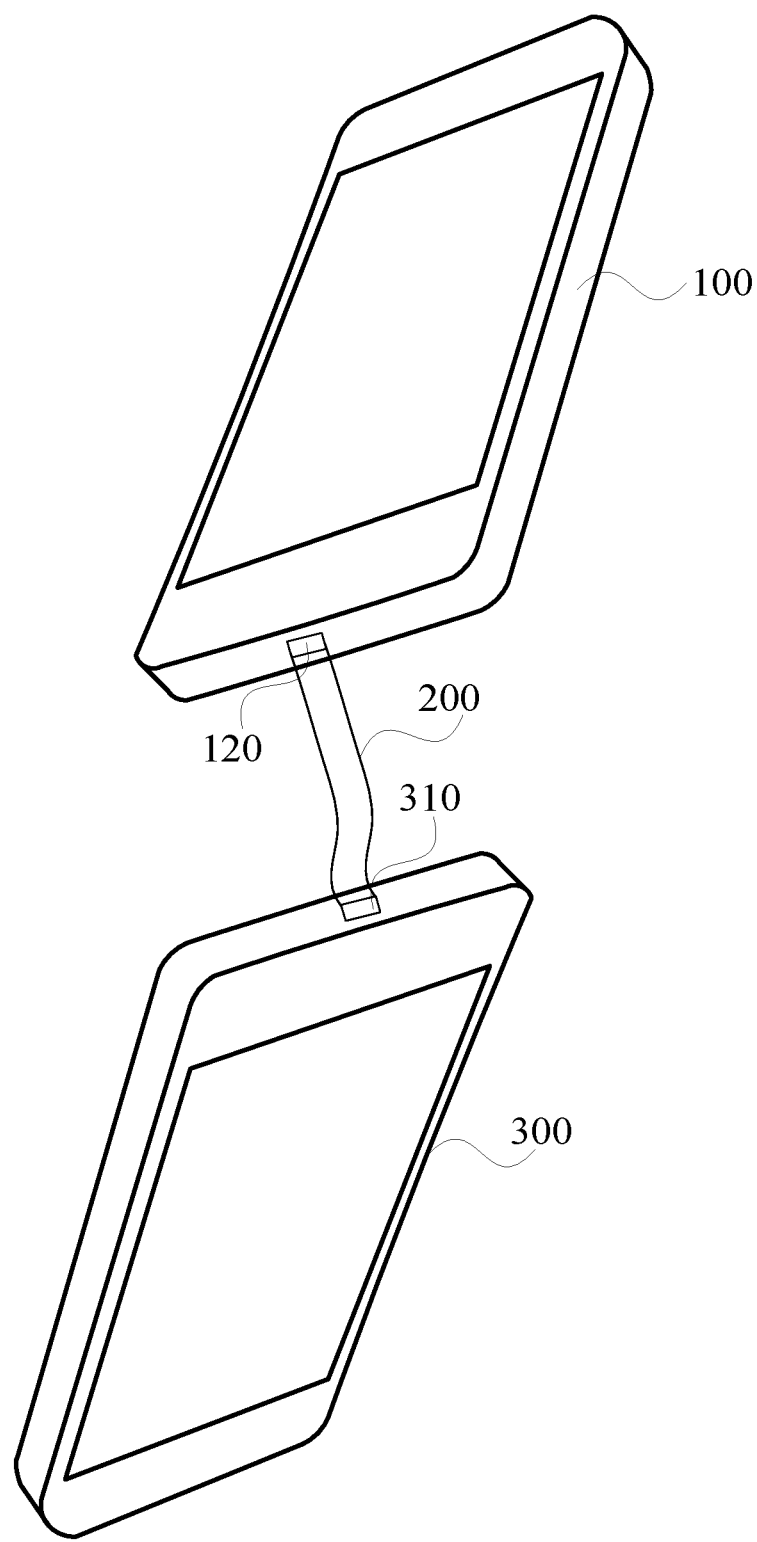
FIG. 1 is a schematic diagram illustrating of a first electronic device reversely charging a second electronic device in accordance with some embodiments of the present disclosure.

For the convenience of description, in the present disclosure, a first electronic device is an electronic device including a charging circuit. The first electronic device may be regarded as a power supply terminal. A second electronic device is an electronic device receiving the current output by the first electronic device. FIG. 1 is a schematic diagram illustrating the reverse charging of the first electronic device to the second electronic device in accordance with some embodiments. A charging interface 120 of a first electronic device 100 is communicated with a charging interface 310 of a second electronic device 300 through a data wire 200 such that the first electronic device 100 charges the second electronic device 300.

Typically, as a comparative example, a first electronic device includes a charging circuit including a control module, a charging module and a charging interface; and the charging module including a rechargeable battery is connected with the control module and the charging interface. The control module is coupled with the charging interface. When the second electronic device is coupled with the charging interface of the first electronic device through a data wire, the charging module detects that an ID pin of the charging interface has pull-down resistance information, then determines the connection between the second electronic device and the charging interface, and sends the information to the control module. The control module controls the charging module to reversely charge the second electronic device in response to the connection between the second electronic device and the charging interface. However, the charging module is controlled by the control module to charge the second electronic device with small current (such as 500 mA), which is quite different from the wired positive charging current of 6 A-8 A, without achieving fast charging and thereby affecting the user experience.

Various embodiments of the present disclosure provide a charging circuit, an electronic device, and a charging control method and device. Detailed description will be given hereinafter.

In the embodiments of the present disclosure, both the first electronic device 100 and the second electronic device 300 include but not limited to a mobile phone, a tablet, an iPad, a digital broadcast terminal, a messaging device, a game console, a medical device, a fitness apparatus, a personal digital assistant, a smart wearable device, a smart TV, and the like.

Figure 2:
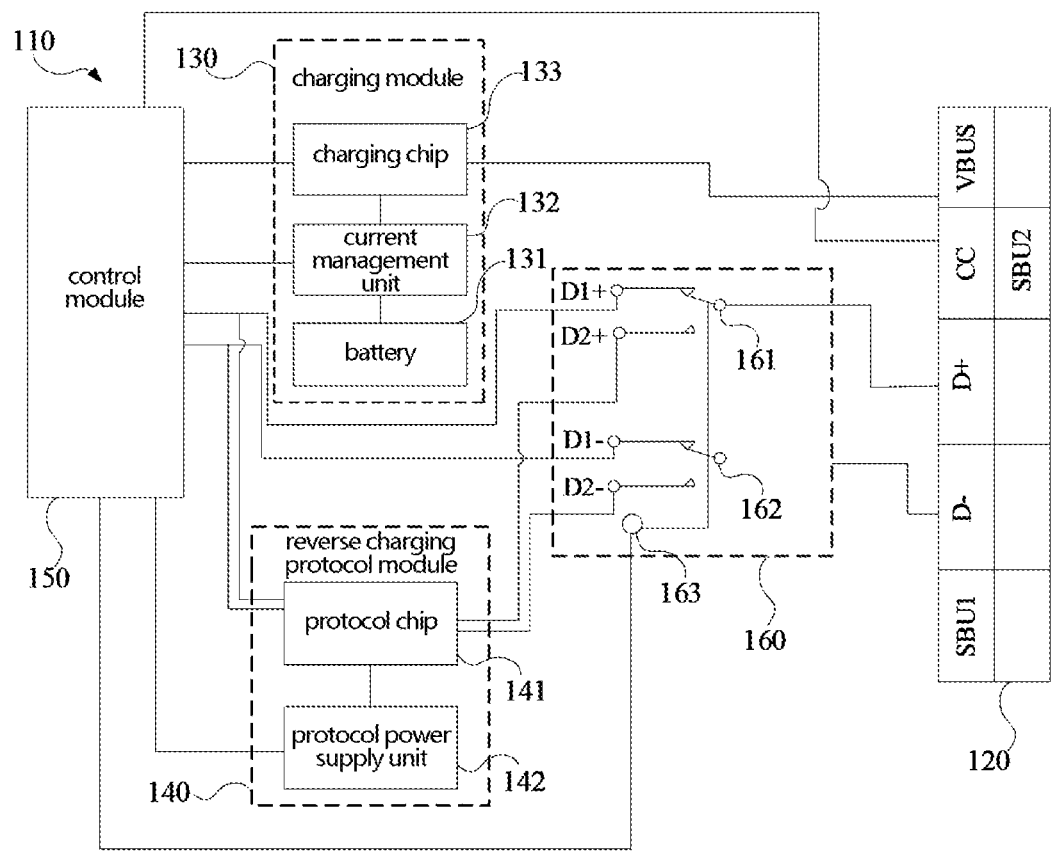
FIG. 2 is a schematic diagram illustrating a charging circuit in accordance with some embodiments of the present disclosure.

FIG. 2 is a schematic diagram illustrating a charging circuit 110 in accordance with some embodiments of the present disclosure. The charging circuit 110 is applied to the first electronic device 100 configured to charge the second electronic device 300. The charging circuit 110 includes a charging interface 120, a charging module 130, a reverse charging protocol module 140 and a control module 150.

In some embodiments, the charging interface 120 includes but not limited to a Mini USB interface, a Micro USB interface, a Dock interface, a Lightning interface or a Type-C interface. Continuously referring to FIG. 2, as an example, the Mini USB interface as the charging interface 120 includes a VBUS pin, a CC pin, a D+ pin, a D-- pin, a SBU1 pin and a SBU2 pin. Herein, the VBUS pin is configured to receive or output current; the CC pin is configured to detect front and back insertion and send a positive charging protocol signal to a charger such that the charger adjusts the value of the current inputted into the charging interface 120 based on the positive charging protocol signal; the D+ pin and the D− pin cooperate with each other to transmit a data signal; and the SBU1 pin and the SBU2 pin cooperate with each other to detect whether the charging interface 120 is coupled with the second electronic device 300. When the second electronic device 300 is coupled with the charging interface 120, both the SBU1 pin and the SBU2 pin can detect information about the pull-down resistance. When the second electronic device 300 is not coupled with the charging interface 120, the SBU1 pin and the SBU2 pin are floating.

In some embodiments, the charging module 130 is coupled with the charging interface 120 and configured to detect the connection between the charging interface 120 and the second electronic device 300 and to adjust the current output to the second electronic device 300. In some embodiments, the charging module 130 is coupled with the VBUS pin, the SBU1 pin and the SBU2 pin of the Mini USB charging interface 120 although the connection between the charging module 130 and the SBU1 and SBU2 pins is not shown in FIG. 2. When the second electronic device 300 is coupled with the Mini USB charging interface 120, the charging module 130 detects that the SBU1 and SBU2 pins of the Mini USB charging interface 120 have pull-down resistance. When the second electronic device 300 is not coupled with the Mini USB charging interface 120, the charging module 130 cannot detect that the SBU1 and SBU2 pins of the Mini USB charging interface 120 have pull-down resistance. As such, whether the charging interface 120 is coupled with the second electronic device 300 can be determined by detecting whether there is pull-down resistance. The charging module 130 outputs the current through the VBUS pin of the Mini USB charging interface 120.

In some other embodiments, the charging module 130 may further receive the current through the charging interface 120 so as to positively charge the first electronic device 100. In some embodiments, the charging module 130 receives the current through the VBUS pin of the Mini USB charging interface 120. Thus, the charging circuit 110 can realize positive and reverse charging, thereby improving the integration and the product competitiveness of the first electronic device 100.

The reverse charging protocol module 140 is configured to determine the reverse charging protocol matched with the current of charging the second electronic device 300. The control module 150 is coupled with the charging module 130 and the reverse charging protocol module 140 and configured to, in response to the connection between the charging interface 120 and the second electronic device 300, acquire the reverse charging protocol determined by the reverse charging protocol module 140, and control the charging module 130 to adjust the current output to the second electronic device 300 based on the reverse charging protocol. In some embodiments, the control module 150 is a central processing unit (CPU).

The charging circuit 110 provided by the embodiment of the present disclosure is applied to the first electronic device 100, and the control module 150 acquires the reverse charging protocol matched with the charging current of the second electronic device 300 and controls the charging module 130 to adjust the current output to the second electronic device 300 based on the reverse charging protocol. As the charging circuit 110 adjusts the current based on the reverse charging protocol and does not directly output small current adapted to all the second electronic devices 300, it is advantageous to increase the output current and the reverse charging speed, thereby improving the user experience. Moreover, the charging circuit 110 is applicable to various second electronic device 300 supporting different charging protocols, improving the product competitiveness of the first electronic device 100.

In some embodiments, the value of the current output by the charging module 130 to the second electronic device 300 is greater than or equal to 1 A. Compared with the current value of 500 mA output to the second electronic device 300 in the comparative example, the value of reverse charging current is increased in the embodiments of the present disclosure, thereby accelerating the reverse charging and improving the user experience.

In some embodiments, the charging module 130 includes a battery 131, a current management unit 132 and a charging chip 133 sequentially connected. The current management unit 132 is configured to adjust the current. The charging chip 133 is configured to detect the connection between the charging interface 120 and the second electronic device 300 and output the current to the second electronic device 300. In some embodiments, the charging chip 133 is connected with the VBUS pin, the SBU1 pin and the SBU2 pin of the Mini USB interface, and is further coupled with the control module 150. The current management unit 132 is coupled with the control module 150. In some embodiments, during reverse charging, the battery 131 inputs the current into the current management unit 132, the current management unit 132 adjusts the current, and then the charging chip 133 outputs the current to the second electronic device 300. In some embodiments, when the charging chip 133 detects the connection between the charging interface 120 and the second electronic device 300, the charging chip 133 sends information about the connection between the charging interface 120 and the second electronic device 300 to the control module 150. Meanwhile, the charging chip 133 is in the On-the-Go (OTG) mode but, at this point, does not output current. In some other embodiments, during positive charging, a charger inputs current to the charging chip 133, the charging chip 133 inputs the current to the current management unit 132, and the current management unit 132 adjusts the current and inputs the current to the battery 131.

In some embodiments, the current management unit 132 includes at least one of a charge pump circuit and a boost circuit. It should be noted that in a case that the current management unit 132 includes the charge pump circuit (referred as a first charge pump circuit), the second electronic device 300 includes a second charge pump circuit matched with the first electronic device 100. In some embodiments, the first charge pump circuit increases the voltage input thereto by n times in a charge pump mode with n times boost, and hence, based on the principle of conservation of energy, the value of the current output to the charging chip 133 is correspondingly reduced. The reduced current is stepped down by the second charge pump circuit, and hence, based on the principle of conservation of energy, the current is increased and inputted into the battery of the second electronic device 300. Thus, the charging speed to the second electronic device 300 is increased. Moreover, small current is transmitted through a data wire between the first electronic device 100 and the second electronic device 300, so the heat loss is reduced. In some embodiments, when the voltage of the battery 131 of the first electronic device 100 is 4.4V, the voltage output to the charging chip 133 by the first charge pump circuit is 8.8V. By the cooperation between the first charge pump circuit and the second charge pump circuit, the value of the current inputted into the battery of the second electronic device 300 may be more than 3 A. Compared with the reverse charging current of 500 mA in the comparative example, the reverse charging current to the second electronic device 300 is obviously increased, thereby accelerating the reverse charging and improving the user experience.

In some other embodiments, the boost circuit (or boost chopping circuit) adopts the boost mode to allow the average voltage output to the charging chip 133 to be greater than the average voltage inputted into the boost circuit, and then increases the output current value of the charging chip 133. In some embodiments, the boost circuit increases the voltage inputted to the charging chip 133 to 5 V, and charges the second electronic device 300 with the current of 2 A. Compared with the reverse charging current of 500 mA in the comparative example, the reverse charging current to the second electronic device 300 is obviously increased, thereby accelerating the reverse charging and improving the user experience.

In some embodiments, continuously referring to FIG. 2, the charging circuit 110 further includes an interface switching module 160 connected with the charging interface 120, the reverse charging protocol module 140 and the control module 150. The control module 150 is further configured to control the interface switching module 160 to communicate the reverse charging protocol module 140 with the charging interface 120 in response to the connection between the charging interface 120 and the second electronic device 300, such that the reverse charging protocol module 140 determines the reverse charging protocol.

Moreover, the control module 150 is further configured to control the interface switching module 160 to disconnect the reverse charging protocol module 140 and the charging interface 120, and to communicate the control module 150 with the charging interface 120, in response to the non-connection between the charging interface 120 and the second electronic device 300, such that the control module 150 control the charging module 130 to receive the current inputted from the charging interface 120. In some embodiments, when the charging interface 120 is not connected with the second electronic device 300, the control module 150 controls the reverse charging protocol module 140 to be disconnected from the charging interface 120. Thus, not only energy consumption is reduced but also the reverse charging protocol module 140 will not affect the positive charging of the first electronic device 100.

In some embodiments, continuously referring to FIG. 2, the interface switching module 160 includes a first single-pole double throw switch 161, a second single-pole double throw switch 162, a D1+ pin, a D1− pin, a D2+ pin, a D2− pin and a switch control contact 163. The switch control contact 163 is connected with the control module 150. The control module 150 controls the switching between the first single-pole double throw switch 161 and the second single-pole double throw switch 162 through the switch control contact 163. The single-pole double throw switch 161 is connected with the D+ pin of the Mini USB interface and may switch between the D1+ pin and the D2+ pin. The second single-pole double throw switch 162 is connected with the D− pin of the Mini USB interface and may switch between the D1− pin and the D2− pin. The D1+ pin and the D1− pin are connected with the control module 150. The D2+ pin and the D2− pin are connected with the reverse charging protocol module 140. The reverse charging protocol module 140 is connected with the control module 150. In some embodiments, the control module 150 controls the first single-pole double throw switch 161 to switch to be connected with the D2+ pin and the second single-pole double throw switch 162 to switch to be connected with the D2− pin in response to the connection between the charging interface 120 and the second electronic device 300, such that the reverse charging protocol module 140 is in signal communication with the charging interface 120 and the control module 150. The control module 150 controls the first single-pole double throw switch 161 to switch to be connected with the D1+ pin and the second single-pole double throw switch 162 to switch to be connected with the D1− pin in response to the non-connection between the charging interface 120 and the second electronic device 300, such that the charging interface 120 is in signal communication with the control module 150 and the reverse charging protocol module 140 is in signal disconnection with the control module 150.

In some embodiments, continuously referring to FIG. 2, the reverse charging protocol module 140 includes a protocol chip 141 and a protocol power supply unit 142 connected with the control module 150. The protocol power supply unit 142 is configured to supply power for the protocol chip 141. The control module 150 is further configured to control the protocol power supply unit 142 to supply power for the protocol chip 141 in response to the connection between the charging interface 120 and the second electronic device 300. In some embodiments, the operating voltage required by the protocol chip 141 is large, and the protocol power supply unit 142 is adopted to supply power for the protocol chip 141, so as to ensure the operation of the protocol chip 141. Moreover, whether the protocol chip 141 operates or not can be controlled by controlling whether the protocol power supply unit 142 supplies power for the protocol chip 141 or not, thereby reducing energy consumption. In some embodiments, the voltage range output by the protocol power supply unit 142 is 4.8V~5.1V. In some embodiments, the protocol chip 141 is connected with the D2+ pin and the D2− pin of the interface switching module 160.

In some embodiments, the reverse charging protocol module 140 supports a first charging protocol and a second charging protocol. A charging current value supported by the second charging protocol is less than a charging current value supported by the first charging protocol. The reverse charging protocol module 140 is configured to:

send a handshake protocol to the second electronic device 300 based on the first charging protocol;

determine the first charging protocol as the reverse charging protocol when receiving a response message sent by the second electronic device 300 according to the handshake protocol; and determine the second charging protocol as the reverse charging protocol is when not receiving the response message sent by the second electronic device 300 according to the handshake protocol.

In some embodiments, when the protocol chip 141 is communicated with the D+ pin and the D− pin of the charging interface 120, the protocol chip 141 sends the handshake protocol of the first charging protocol to the second electronic device 300 through the D+ pin and the D− pin of the charging interface 120 at first. After the second electronic device 300 receives the handshake protocol, if supporting the first charging protocol, the second electronic device 300 sends a response message to the first electronic device 100. If not supporting the first charging protocol, the second electronic device 300 does not send the response message to the first electronic device 100.

In some embodiments, the handshake protocol to the second electronic device 300 is sent preferably based on the first charging protocol, so as to adopt the first charging protocol supporting large charging current to charge the second electronic device 300 after successful handshake, thereby accelerating the charging and improving the user experience. When not supporting the first charging protocol, adopts the second charging protocol is adopted to charge the second electronic device 300. Thus, the charging circuit 110 may be compatible with different charging protocols to widen the scope of application. In some embodiments, a reference time period is stored in the reverse charging protocol module 140.

In some embodiments, the first charging protocol includes QC protocol, and the second charging protocol includes BC protocol. In some embodiments, the QC protocol includes QC3.0 protocol, and the BC protocol includes BC1.2 protocol. The QC3.0 protocol is a high-pass protocol, and the charging voltage may be modulated from 3.6 to 12 V at 0.2 V in one step. The output voltage of the BC1.2 protocol may be 5 V, and the current value may be 1.5 A or 2 A. In some embodiments, the charging current value corresponding to the QC3.0 protocol is higher than the charging current value corresponding to the BC1.2 protocol, such as more than 3 A. In some embodiments, the adoption of the above two reverse charging protocols can obviously increase the current value output to the second electronic device 300, thereby increasing the reverse charging speed and improving the user experience. In addition, the first charging protocol and the second charging protocol may further be other charging protocols, and the charging current value supported by the second charging protocol is smaller than the charging current value supported by the first charging protocol. The type of the first charging protocol and the second charging protocol is not specifically limited in the present disclosure, and the QC protocol and the BC protocol are only examples.

In some embodiments, the charging module 130 including a charge pump circuit and a boost circuit is configured to adjust the current, that is, the current management unit 132 includes the charge pump circuit and the boost circuit.

The control module 150 is specifically configured to control the charge pump circuit to adjust the current in response to a case that the QC protocol is determined as the reverse charging protocol.

The control module 150 is specifically configured to control the boost circuit to adjust the current in response to a case that the BC protocol is determined as the reverse charging protocol.

In some embodiments, the QC protocol and the BC protocol are widely applied in the electronic device. By the cooperation between the QC protocol and the BC protocol, the charging circuit 110 can charge the second electronic device 300 that supports at least one of the QC protocol and the BC protocol, so the scope of application of the charging circuit 110 is expanded.

Figure 3:
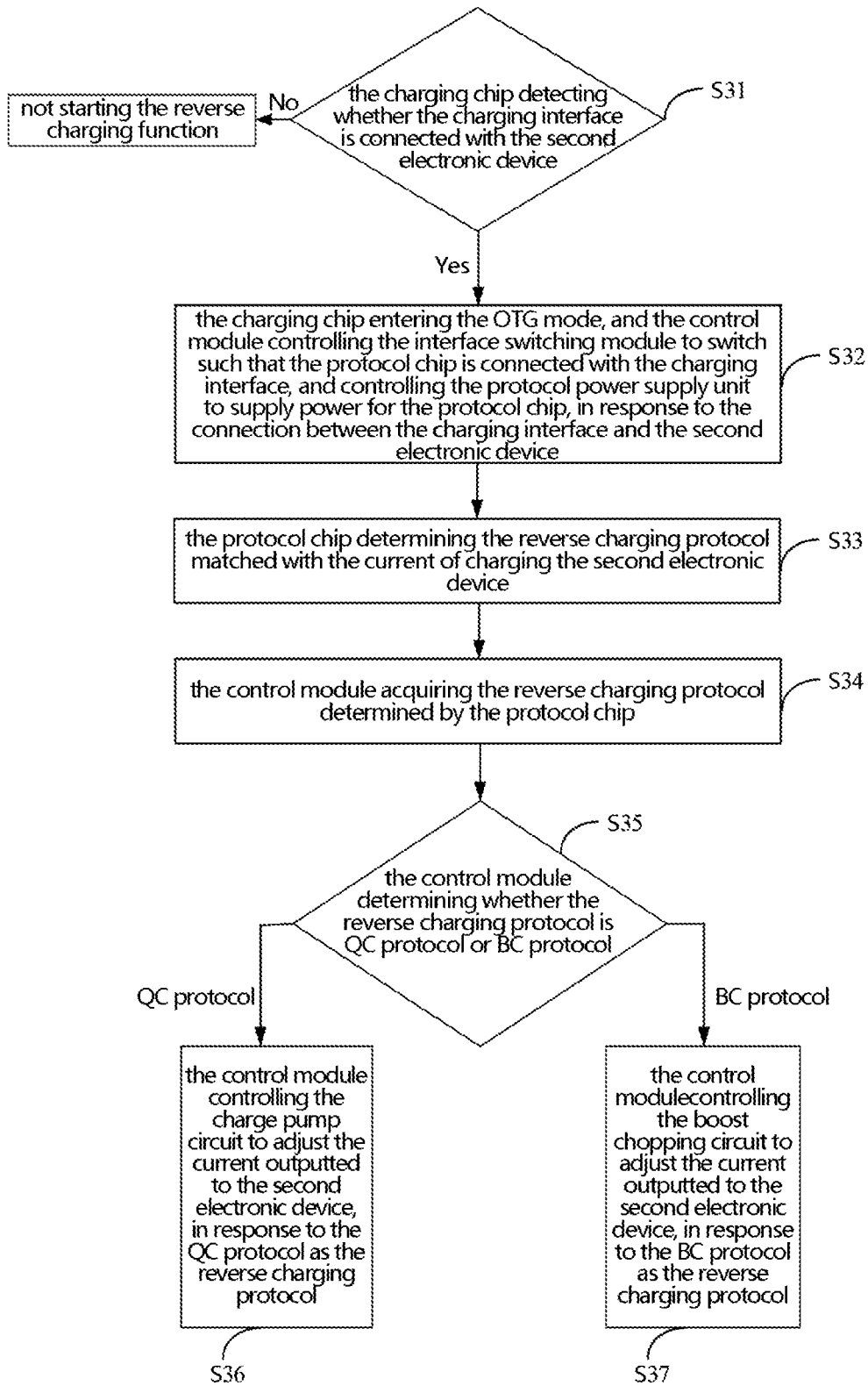
FIG. 3 is a flowchart illustrating an operating method of the charging circuit in accordance with some embodiments of the present disclosure.

FIG. 3 is a flowchart illustrating an operating method of the charging circuit 110 in accordance with some embodiments of the present disclosure. Referring to FIG. 3, the operating method of the charging circuit 110 includes the following steps:

S31: the charging chip 133 detecting whether the charging interface 120 is connected with the second electronic device 300, executing S32 if yes, and not starting the reverse charging function if not.

S32: the charging chip 133 entering the OTG mode, and the control module 150 controlling the interface switching module 160 to switch such that the protocol chip 141 is connected with the charging interface 120, and controlling the protocol power supply unit 142 to supply power for the protocol chip 141, in response to the connection between the charging interface 120 and the second electronic device 300.

S33: the protocol chip 141 determining the reverse charging protocol matched with the charging current of the second electronic device 300.

S34: the control module 150 acquiring the reverse charging protocol determined by the protocol chip 141.

S35: the control module 150 determining whether the reverse charging protocol is QC protocol or BC protocol, executing S36 if the reverse charging protocol is the QC protocol, or executing S37 if the reverse charging protocol is the BC protocol.

S36: the control module 150 controlling the charge pump circuit to adjust the current output to the second electronic device 300 in response to the QC protocol as the reverse charging protocol.

S37: the control module 150 to controlling the boost circuit to adjust the current output to the second electronic device 300 in response to the BC protocol as reverse charging protocol.

In some embodiments, the charging module 130 is further configured to detect the battery value stored in the charging circuit 110; and the control module 150 is further configured to acquire the battery value detected by the charging module 130 in response to the battery value less than a first predetermined threshold, and send out a prompting message, so as to avoid exhausting the power of the first electronic device 100 due to overcharging the second electronic device 300.

In some embodiments, the control module 150 is further configured to control the charging module 130 to output first current to the second electronic device 300, in response to the battery value greater than or equal to the first predetermined threshold and less than or equal to a second predetermined threshold.

In some embodiments, the control module 150 is further configured to control the charging module 130 to adjust the second current output to the second electronic device 300 in response to the battery value greater than the second predetermined threshold, and the value of the second current is greater than the value of the first current.

In some embodiments, when the battery value of the first electronic device 100 is relatively large, large second current may be adopted to charge the second electronic device 300, so as to accelerate the charging. When the battery value of the first electronic device 100 is small, small first current may be adopted to charge the second electronic device 300, such that the first electronic device 100 will not run out of power quickly, thereby guaranteeing the normal operation of the first electronic device 100.

Figure 4:
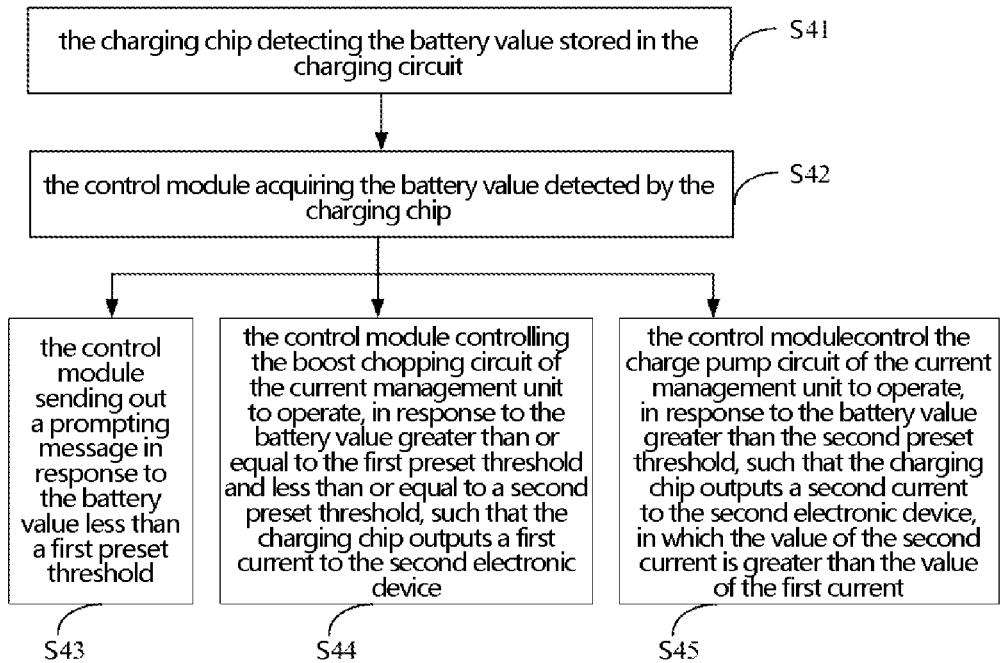
FIG. 4 is a flowchart illustrating an operating method of the charging circuit in accordance with some embodiments of the present disclosure.

FIG. 4 is a flowchart illustrating an operating method of the charging circuit 110 in accordance with some embodiments of the present disclosure. Referring to FIG. 4, the operating method of the charging circuit 110 further includes the following steps:

S41: the charging chip 133 detecting the battery value stored in the charging circuit 110.

S42: the control module 150 acquiring the battery value detected by the charging chip 133.

S43: the control module 150 sending out a prompting message in response to the battery value less than a first predetermined threshold.

S44: the control module 150 controlling operation of the boost circuit of the current management unit 132 in response to the battery value greater than or equal to the first predetermined threshold and less than or equal to a second predetermined threshold, then the charging chip 133 outputting a first current to the second electronic device 300.

Or S45: the control module 150 controlling the operation of the charge pump circuit of the current management unit 132 in response to the battery value greater than the second predetermined threshold, then the charging chip 133 outputting a second current to the second electronic device 300, in which the value of the second current is greater than the value of the first current.

In some embodiments, the second electronic device 300 supports QC3.0 protocol. When the battery value of the first electronic device 100 is in a range of 40%-100%, the control module 150 controls the current management unit 132 to adjust the current in charge pump mode, and the charging chip 133 outputs the current to the second electronic device 300. When the battery value of the first electronic device 100 is in a range of 20%-40%, the control module 150 controls the current management unit 132 to adjust the current in boost mode, and the charging chip 133 outputs the current to the second electronic device 300. When the battery value of the first electronic device 100 is lower than 20%, the first electronic device 100 may pop up an interactive interface, and a user controls whether the first electronic device 100 charges the second electronic device 300 or not according to the interactive interface.

The charging circuit 110 provided by the embodiments of the present disclosure is applied to the first electronic device 100, and the control module 150 acquires the reverse charging protocol matched with the current of charging the second electronic device 300, and controls the charging module 130 to adjust the current output to the second electronic device 300 based on the reverse charging protocol. As the charging circuit 110 adjusts the current based on the reverse charging protocol and does not directly output the small current adapted to all the second electronic devices 300, the output current is increased, thereby accelerating the reverse charging and improving the user experience. Moreover, the charging circuit 110 is applicable to the second electronic devices 300 supporting different charging protocols, thereby improving the product competitiveness of the first electronic device 100. In the embodiments of the present disclosure, the QC protocol is preferable to cooperate with the charge pump circuit to adjust the current. Compared with the BC protocol cooperating with the boost circuit to adjust the current, the heat loss between the first electronic device 100 and the second electronic device 300 is reduced. The charging circuit 110 provided by the embodiments of the present disclosure may further adjust the current based on the stored battery value, and can accelerate the charging of the second electronic device 300 while ensuring the normal operation of the first electronic device 100.

Figure 5:
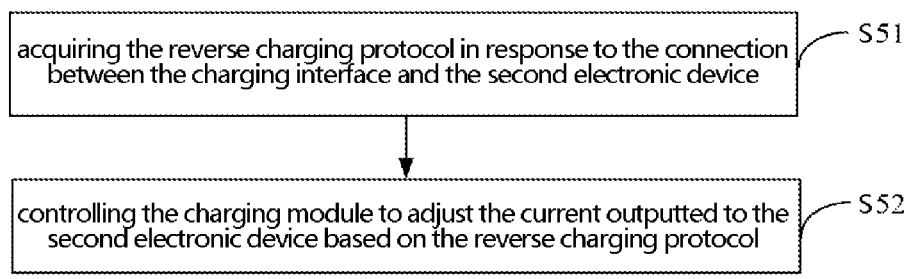
FIG. 5 is a flowchart illustrating a charging control method in accordance with some embodiments of the present disclosure.

FIG. 5 is a flowchart illustrating a charging control method in accordance with some embodiments of the present disclosure. The charging control method provided by the embodiments of the present disclosure is applied to a first electronic device comprising a charging circuit having a charging interface and a charging module. The first electronic device is configured to charge a second electronic device. The charging control method includes the following steps:

S51: acquiring the reverse charging protocol matched with the charging current of the second electronic device in response to the connection between the charging interface and the second electronic device.

S52: controlling the charging module to adjust the current output to the second electronic device based on the reverse charging protocol.

In some embodiments, the reverse charging protocol includes a first charging protocol and a second charging protocol; the charging current value supported by the second charging protocol is less than the charging current value supported by the first charging protocol; and the step of acquiring the reverse charging protocol includes:

acquiring the first charging protocol when receiving a response message sent by the second electronic device in response to a handshake protocol sent by the first electronic device based on the first charging protocol; and acquiring the second charging protocol when not receiving the response message within a reference time period.

The first charging protocol is preferably adapted to charge the second electronic device, accelerating the charging and improving the user experience. When the second electronic device does not support the first charging protocol, the second charging protocol is adopted to charge the second electronic device. Thus, the charging circuit is compatible with different charging protocols so as to widen the application scope thereof.

In some embodiments, the first charging protocol includes QC protocol, and the second charging protocol includes BC protocol. The charging module includes a charge pump circuit and a boost circuit and is configured to adjust the current. The step S52 includes:

controlling the charge pump circuit to adjust the current in response to the QC protocol determined as the reverse charging protocol; and controlling the boost circuit to adjust the current in response to the BC protocol determined as the reverse charging protocol.

It should be noted that the first charging protocol and the second charging protocol may further be other charging protocols, and the QC protocol and the BC protocol are only examples. The above description about the QC protocol, the BC protocol, the charge pump circuit and the boost circuit can be referred to, and will not be repeated herein.

In some embodiments, the first electronic device further comprises a reverse charging protocol module including a protocol chip and a protocol power supply unit configured to supply power for the protocol chip. The charging control method further comprises:

controlling the protocol power supply unit to supply power for the protocol chip in response to the connection between the charging interface and the second electronic device. Thus, whether the protocol chip operates or not depends on whether the protocol power supply unit supplies power for the protocol chip or not, thereby reducing the energy consumption.

In some embodiments, the charging circuit further includes an interface switching module; and the charging control method further comprises:

controlling the interface switching module to communicate the reverse charging protocol module with the charging interface in response to the connection between the charging interface and the second electronic device, such that the reverse charging protocol module determines the reverse charging protocol.

In some embodiments, the charging control method further comprises:

controlling the interface switching module to disconnect the reverse charging protocol module and the charging interface, and controlling the charging module to receive the current inputted from the charging interface, in response to the non-connection between the charging interface and the second electronic device. When the charging interface is not connected with the second electronic device, the reverse charging protocol module is controlled to be disconnected from the charging interface. Thus, not only the energy consumption is reduced but also the reverse charging protocol module will not affect the positive charging of the first electronic device.

In some embodiments, the charging module is further configured to detect the battery value stored in the charging circuit; and the charging control method further comprises:

acquiring the battery value detected by the charging module;

sending out a prompting message in response to the battery value less than a first predetermined threshold, in which the prompting message includes but not limited to voice prompt, image prompt of an interactive interface, and the like;

controlling the charging module to adjust a first current output to the second electronic device in response to the battery value greater than or equal to the first predetermined threshold and less than or equal to a second predetermined threshold; and controlling the charging module to adjust a second current output to the second electronic device in response to the battery value greater than the second predetermined threshold, in which the value of the second current is greater than the value of the first current.

The charging control method provided by the embodiments of the present disclosure acquires the reverse charging protocol determined by the reverse charging protocol module in response to the connection between the charging interface and the second electronic device, and controls the charging module to adjust the current output to the second electronic device based on the reverse charging protocol. As the charging control method adjusts the current based on the reverse charging protocol but not directly outputs small current adapted to all the second electronic devices, the output current is increased, accelerating the reverse charging and improving the user experience. Moreover, the charging control method is applicable to the second electronic device supporting different charging protocols, thereby improving the product competitiveness of the first electronic device.

Figure 6:
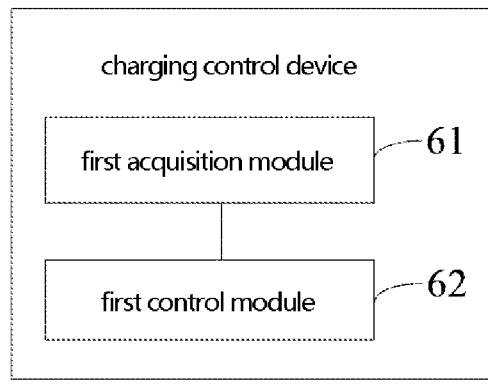
FIG. 6 is a block diagram illustrating a charging control device in accordance with some embodiments of the present disclosure.

FIG. 6 is a block diagram of a charging control device in accordance with some embodiments of the present disclosure. The charging control device is applied to a first electronic device including a charging circuit having a charging interface and a charging module. The first electronic device is configured to charge a second electronic device. The charging control device comprises:

a first acquisition module 61 configured to acquire the reverse charging protocol matched with the charging current of the second electronic device, in response to the connection between the charging interface and the second electronic device; and a first control module 62 configured to control the charging module to adjust the current output to the second electronic device based on the reverse charging protocol.

In some embodiments, the reverse charging protocol includes a first charging protocol and a second charging protocol, and the charging current value supported by the second charging protocol is less than the charging current value supported by the first charging protocol.

The first acquisition module 61 includes:

a first acquisition unit configured to acquire the first charging protocol if receiving a response message sent by the second electronic device in response to a handshake protocol sent by the first electronic device based on the first charging protocol; and a second acquisition unit configured to acquire the second charging protocol if not receiving the response message within a reference time period.

Figure 7:
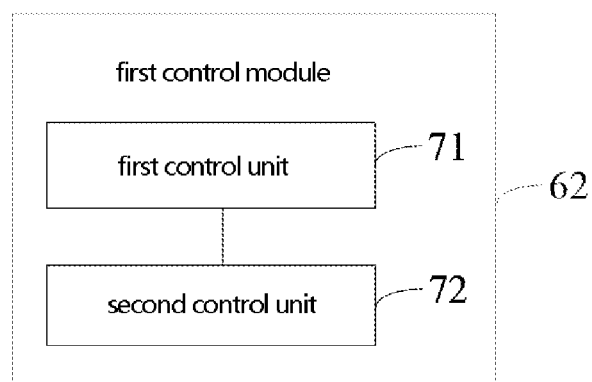
FIG. 7 is a block diagram illustrating a first control module in accordance with some embodiments of the present disclosure.

FIG. 7 is a block diagram illustrating a first control module in accordance with some embodiments of the present disclosure. In some embodiments, the first charging protocol includes QC protocol, and the second charging protocol includes BC protocol. The charging module includes a charge pump circuit and a boost circuit and is configured to adjust the current. The first control module 62 includes:

a first control unit 71 configured to control the charge pump circuit to adjust the current in response to the QC protocol as the reverse charging protocol; and a second control unit 72 configured to control the boost circuit to adjust the current in response to the BC protocol as the reverse charging protocol.

In some embodiments, the first electronic device further includes a reverse charging protocol module including a protocol chip and a protocol power supply unit configured to supply power for the protocol chip; and the charging control device further comprises:

a second control module configured to control the protocol power supply unit to supply power for the protocol chip in response to the connection between the charging interface and the second electronic device.

In some embodiments, the charging circuit further includes an interface switching module; and the charging control device further comprises:

a third control module configured to control the interface switching module to communicate the reverse charging protocol module with the charging interface in response to the connection between the charging interface and the second electronic device, such that the reverse charging protocol module determines the reverse charging protocol.

In some embodiments, the charging control device further comprises:

a fourth control module configured to control the interface switching module to disconnect the reverse charging protocol module with the charging interface in response to the non-connection between the charging interface and the second electronic device, and control the charging module to receive the current inputted from the charging interface.

In some embodiments, the charging module further detects the battery value stored in the charging circuit; and the charging control device further comprises:

a second acquisition module configured to acquire the battery value detected by the charging module;

a prompting module configured to send out a prompting message in response to the battery value less than a first predetermined threshold;

a fifth control module configured to control the charging module to adjust the first current output to the second electronic device in response to the battery value greater than or equal to the first predetermined threshold and less than or equal to a second predetermined threshold; and a sixth control module configured to control the charging module to adjust the second current output to the second electronic device in response to the battery value greater than the second predetermined threshold, in which the value of the second current is greater than the value of the first current.

Figure 8:
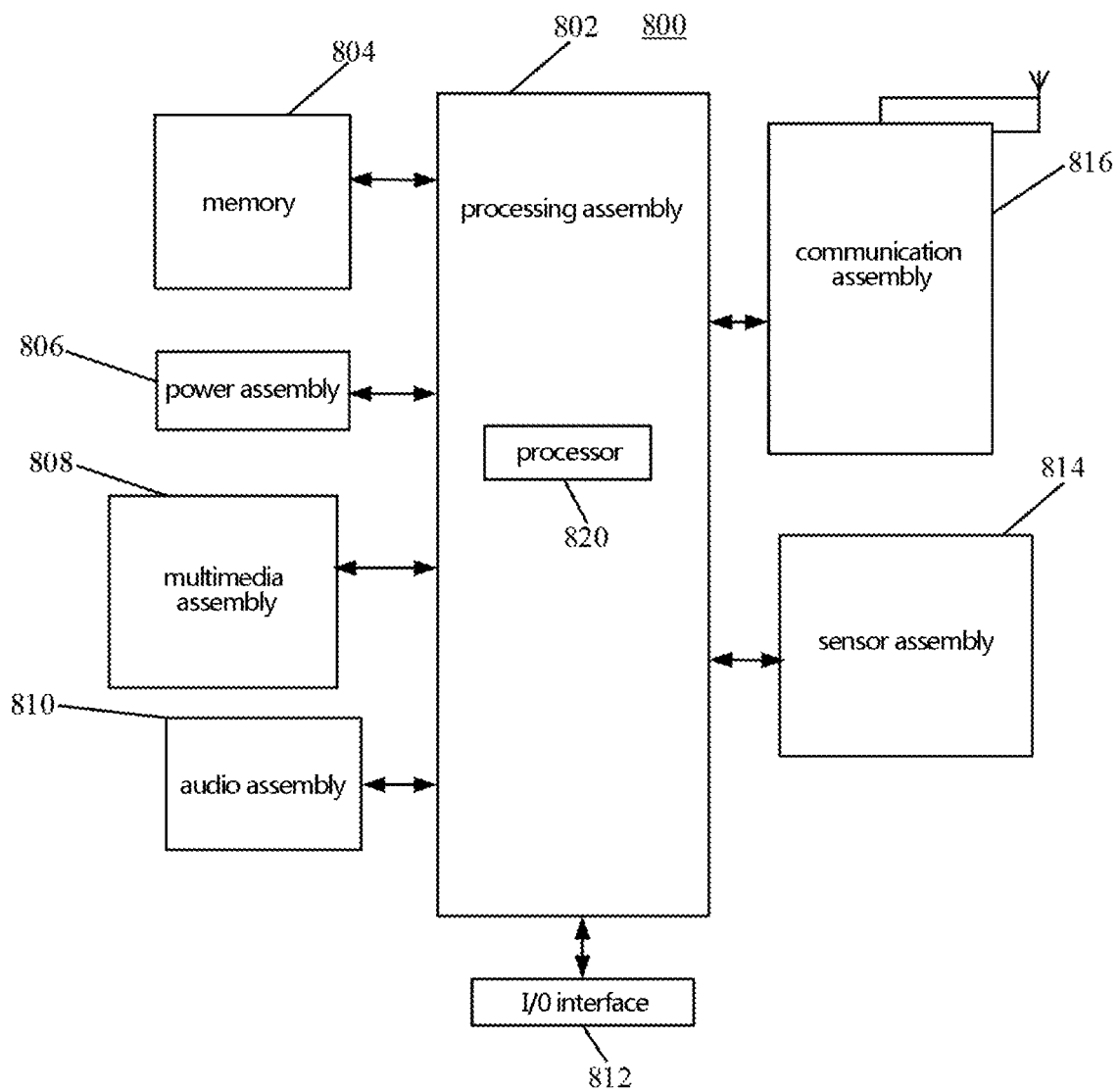
FIG. 8 is a schematic structural view illustrating a charging control device in accordance with some embodiments of the present disclosure.

FIG. 8 is a schematic structural view illustrating a charging control device 800 in accordance with some embodiments. For example, the device 800 may be a mobile phone, a computer, a digital broadcasting terminal, a messaging device, a game console, a tablet, a medical device, a fitness apparatus, a personal digital assistant, and the like.

Referring to FIG. 8, the device 800 may comprise one or more of a processing assembly 802, a memory 804, a power assembly 806, a multi-media assembly 808, an audio assembly 810, an input/output (I/O) interface 812, a sensor assembly 814 and a communication assembly 816.

The processing assembly 802 typically controls overall operations of the device 800, such as the operations associated with display, telephone calls, data communications, camera operations, and recording operations. The processing assembly 802 may include one or more processors 820 to execute instructions to perform all or part of the steps in the above described methods. Moreover, the processing assembly 802 may include one or more modules which facilitate the interaction between the processing assembly 802 and other assemblies. For instance, the processing assembly 802 may include a multimedia module to facilitate the interaction between the multimedia assembly 808 and the processing assembly 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power assembly 806 provides power to various assemblies of the device 800. The power assembly 806 may include a power management system, one or more power sources, and any other assemblies associated with the generation, management, and distribution of power in the device 800.

The multimedia assembly 808 includes a screen providing an output interface between the device 800 and the user. In some embodiments, the screen may include a liquid crystal display (LCD) and a touch panel (TP). In some embodiments, an organic light-emitting diode (OLED) display can be adopted.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia assembly 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio assembly 810 is configured to output and/or input audio signals. For example, the audio assembly 810 includes a microphone (MIC) configured to receive an external audio signal when the device 800 is in an operation mode, such as a call mode, a recording mode, and a voice recognition mode. The received audio signal may be further stored in the memory 804 or transmitted via the communication assembly 816. In some embodiments, the audio assembly 810 further includes a speaker to output audio signals.

The I/O interface 812 provides an interface between the processing assembly 802 and peripheral interface modules, such as a keyboard, a click wheel, buttons, and the like. The buttons may include, but are not limited to, a home button, a volume button, a starting button, and a locking button.

The sensor assembly 814 includes one or more sensors to provide status assessments of various aspects of the device 800. For instance, the sensor assembly 814 may detect an open/closed status of the device 800, relative positioning of assemblies, e.g., the display and the keypad, of the device 800, a change in position of the device 800 or an assembly of the device 800, a presence or absence of user contact with the device 800, an orientation or an acceleration/deceleration of the device 800, and a change in temperature of the device 800. The sensor assembly 814 may include a proximity sensor configured to detect the presence of nearby objects without any physical contact. The sensor assembly 814 may also include a light sensor, such as a CMOS or CCD image sensor, for use in imaging applications. In some embodiments, the sensor assembly 814 may also include an accelerometer sensor, a gyroscope sensor, a magnetic sensor, a pressure sensor, or a temperature sensor.

The communication assembly 816 is configured to facilitate communication, wired or wirelessly, between the device 800 and other devices. The device 800 can access a wireless network based on a communication standard, such as Wi-Fi, 2G, 3G, 4G, 5G or a combination thereof. In one exemplary embodiment, the communication assembly 816 receives a broadcast signal or broadcast associated information from an external broadcast management system via a broadcast channel. In one exemplary embodiment, the communication assembly 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic assemblies, for performing the above described methods.

In exemplary embodiments, there is also provided a non-transitory computer-readable storage medium including instructions, such as included in the memory 804, executable by the processor 820 in the device 800, for performing the above-described methods. For example, the non-transitory computer-readable storage medium may be a ROM, a random-access memory (RAM), a CD-ROM, a magnetic tape, a floppy disc, an optical data storage device, and the like.

Various embodiments of the charging circuit provided by the present disclosure can have one or more of the following advantages.

The charging circuit is applied to the first electronic device, and the control module acquires the reverse charging protocol matched with the current of charging the second electronic device and controls the charging module to adjust the current output to the second electronic device based on the reverse charging protocol. As the charging circuit adjusts the current based on the reverse charging protocol and does not directly output small current adapted to all the second electronic devices, it is advantageous to increase the output current and the reverse charging speed, thereby improving the user experience. Moreover, the charging circuit is applicable to the second electronic device supporting different charging protocols, improving the product competitiveness of the first electronic device.

Regarding the embodiments of the charging control method and the charging control device, since they basically correspond to the embodiments of the charging circuit, the relevant parts may refer to partial description of the embodiments of the charging circuit. The embodiments of the charging circuit and the embodiments of the charging control method and the charging control device complement each other.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms, and these phrases may be interchangeably used.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A charging circuit, applied to a first electronic device configured to charge a second electronic device, the charging circuit comprising: a charging interface;
   a charging module connected with the charging interface, and configured to detect connection between the charging interface and the second electronic device and adjust a current output to the second electronic device;
   a reverse charging protocol module configured to determine a reverse charging protocol matched with a charging current of the second electronic device; and a control module connected with the charging module and the reverse charging protocol module, and configured to acquire the reverse charging protocol determined by the reverse charging protocol module in response to the connection between the charging interface and the second electronic device, and control the charging module to adjust the current output to the second electronic device based on the reverse charging protocol;

wherein the reverse charging protocol module supports a first charging protocol and a second charging protocol, a charging current value supported by the second charging protocol being less than a charging current value supported by the first charging protocol; and the reverse charging protocol module is configured to: send a handshake protocol to the second electronic device based on the first charging protocol; determine the first charging protocol as the reverse charging protocol when receiving a response message sent by the second electronic device according to the handshake protocol; and determine the second charging protocol as the reverse charging protocol when not receiving the response message sent by the second electronic device according to the handshake protocol.

2. The charging circuit according to claim 1, wherein the charging module comprises: a battery, a current management unit and a charging chip sequentially connected, wherein the current management unit is configured to adjust the current, and the charging chip is configured to detect the connection between the charging interface and the second electronic device and output the current to the second electronic device.

3. The charging circuit according to claim 1, wherein the current management unit comprises at least one of a charge pump circuit and a boost circuit.

4. The charging circuit according to claim 1, wherein the first charging protocol comprises QC protocol, and the second charging protocol comprises BC protocol.

5. The charging circuit according to claim 4, wherein the charging module comprises a charge pump circuit and a boost circuit and is configured to adjust the current;

the control module is configured to control the charge pump circuit to adjust the current in response to the QC protocol as the reverse charging protocol; and the control module is configured to control the boost circuit to adjust the current in response to the BC protocol as the reverse charging protocol.

6. The charging circuit according to claim 1, wherein the reverse charging protocol module comprises a protocol chip and a protocol power supply unit configured to supply power for the protocol chip, the protocol chip and a protocol power supply unit being connected with the control module; and the control module is further configured to control the protocol power supply unit to supply power for the protocol chip in response to the connection between the charging interface and the second electronic device.

7. The charging circuit according to claim 1, further comprising an interface switching module connected with the charging interface, the reverse charging protocol module and the control module; and the control module is further configured to control the interface switching module to communicate the reverse charging protocol module with the charging interface in response to the connection between the charging interface and the second electronic device, such that the reverse charging protocol module determines the reverse charging protocol.

8. The charging circuit according to claim 7, wherein the control module is further configured to control the interface switching module to disconnect the reverse charging protocol module with the charging interface in response to non-connection between the charging interface and the second electronic device, and to communicate the control module with the charging interface such that the control module controls the charging module to receive a current inputted from the charging interface.

9. The charging circuit according to claim 1, wherein the charging module is further configured to detect the battery value stored by the charging circuit;

the control module is further configured to acquire the battery value detected by the charging module, and send out a prompting message in response to the battery value less than a first predetermined threshold;

the control module is further configured to control the charging module to adjust a first current output to the second electronic device, in response to the battery value greater than or equal to the first predetermined threshold and less than or equal to a second predetermined threshold; and the control module is further configured to control the charging module to adjust a second current output to the second electronic device, in response to the battery value is greater than the second predetermined threshold, value of the second current being greater than the value of the first current.

10. A mobile terminal comprising the charging circuit according to claim 1, wherein the charging circuit is configured to:

charge a plurality of second electronic devices with different charging protocols; and adjust the current based on the reverse charging protocol and not directly output currents suitable for all of the plurality of second electronic devices, thereby increasing the current output to the second electronic device.

11. A charging control method, applied to a first electronic device configured to charge a second electronic device and comprising a charging circuit having a charging interface and a charging module, the charging control method comprising steps of:

acquiring a reverse charging protocol matched with a current of charging the second electronic device, in response to connection between the charging interface and the second electronic device; and controlling the charging module to adjust the current output to the second electronic device based on the reverse charging protocol;

wherein the reverse charging protocol comprises a first charging protocol and a second charging protocol; a charging current value supported by the second charging protocol is less than a charging current value supported by the first charging protocol; and the step of acquiring the reverse charging protocol comprises:

acquiring the first charging protocol when receiving a response message sent by the second electronic device in response to a handshake protocol sent by the first electronic device based on the first charging protocol; and acquiring the second charging protocol when not receiving the response message within a reference time period.

12. The charging control method according to claim 11, wherein the first charging protocol comprises QC protocol; the second charging protocol comprises BC protocol; the charging module comprises a charge pump circuit and a boost circuit; and the step of controlling the charging module to adjust the current output to the second electronic device based on the reverse charging protocol comprises:

controlling the charge pump circuit to adjust the current in response to the QC protocol determined as the reverse charging protocol; and controlling the boost circuit to adjust the current in response to the BC protocol determined as the reverse charging protocol.

13. The charging control method according to claim 11, wherein the first electronic device further comprises a reverse charging protocol module comprising a protocol chip and a protocol power supply unit configured to supply power for the protocol chip, the charging control method further comprising:

controlling the protocol power supply unit to supply power for the protocol chip in response to the connection between the charging interface and the second electronic device.

14. The charging control method according to claim 11, wherein the charging circuit further comprises an interface switching module, the charging control method further comprising:

controlling the interface switching module to communicate the reverse charging protocol module with the charging interface in response to the connection between the charging interface and the second electronic device, such that the reverse charging protocol module determines the reverse charging protocol.

15. The charging control method according to claim 14, further comprising:

controlling the interface switching module to disconnect the reverse charging protocol module and the charging interface and controlling the charging module to receive a current inputted from the charging interface, in response to the non-connection between the charging interface and the second electronic device.

16. The charging control method according to claim 11, wherein the charging module is further configured to detect the battery value stored by the charging circuit, the charging control method further comprising:

acquiring the battery value detected by the charging module;

sending out a prompting message in response to the battery value less than a first predetermined threshold;

controlling the charging module to adjust a first current output to the second electronic device in response to the battery value greater than or equal to the first predetermined threshold and less than or equal to a second predetermined threshold; and controlling the charging module to adjust a second current output to the second electronic device in response to the battery value greater than the second predetermined threshold, value of the second current being greater than value of the first current.

17. A charging control device, applied to a first electronic device configured to charge a second electronic device and comprising a charging circuit having a charging interface and a charging module, the charging control device comprising:

a first acquisition module configured to acquire a reverse charging protocol matched with a current of charging the second electronic device in response to connection between the charging interface and the second electronic device; and a first control module configured to control the charging module to adjust the current output to the second electronic device based on the reverse charging protocol;

wherein the reverse charging protocol comprises a first charging protocol and a second charging protocol; a charging current value supported by the second charging protocol is less than a charging current value supported by the first charging protocol; and the reverse charging protocol is acquired by:

acquiring the first charging protocol when receiving a response message sent by the second electronic device in response to a handshake protocol sent by the first electronic device based on the first charging protocol; and acquiring the second charging protocol when not receiving the response message within a reference time period.

18. A non-transitory computer-readable storage medium, having stored thereon programs, for execution by a processor to implement the charging control method of claim 11.

* * * * *